United States Patent [19]

Chang

[11] Patent Number: 5,790,053
[45] Date of Patent: Aug. 4, 1998

[54] KEYBOARD STRUCTURE OF A PORTABLE COMPUTER

[75] Inventor: Chih-Ching Chang, Taipei, Taiwan

[73] Assignee: Compal Electronics, Inc., Taipei, Taiwan

[21] Appl. No.: 816,247

[22] Filed: Mar. 13, 1997

[51] Int. Cl.⁶ ................................................. H03K 17/94
[52] U.S. Cl. .................... 341/22; 364/708.1; 400/489
[58] Field of Search .......................... 341/22, 20; 345/168, 345/169; 364/708.1; 400/488, 489, 492; 361/680; 403/84; 16/223; 108/4, 50

[56] References Cited

U.S. PATENT DOCUMENTS

| | | | |
|---|---|---|---|
| 4,597,681 | 7/1986 | Hodges | 341/22 |
| 5,454,652 | 10/1995 | Huellemeier et al. | 400/489 |
| 5,466,078 | 11/1995 | Szmanda et al. | 400/489 |
| 5,498,165 | 3/1996 | Tseng | 364/708.1 |
| 5,526,756 | 6/1996 | Watson | 108/50 |
| 5,702,197 | 12/1997 | Chen | 403/84 |

*Primary Examiner*—Michael Horabik
*Assistant Examiner*—Andrew Hill
*Attorney, Agent, or Firm*—Pro-Techtor International Services

[57] ABSTRACT

A keyboard structure of a portable computer, in which the keyboard is divided by a dividing line into two separate keyboard divisions which can be pivoted apart about a pivot center of the top end of the dividing line. Two supporting rods which are pivotally connected to each other are respectively disposed on bottom sides of the keyboard divisions. Two thread guide blocks are respectively pivotally connected to outer ends of the supporting rods and fitted around opposite thread sections of the thread rod. By means of directly shifting apart the keyboard divisions, the thread guide blocks are driven to rotate and slide toward two ends of the thread rod. When the thread guide blocks rotate, the connecting portion of the supporting rods is gradually lifted, whereby when the keyboard divisions are stretched apart, the rear end of the keyboard is also lifted by a certain inclination angle to facilitate the operation of an operator.

2 Claims, 4 Drawing Sheets

KEYBOARD STRUCTURE OF A PORTABLE COMPUTER

BACKGROUND OF THE INVENTION

The present invention relates to a keyboard structure of a portable computer, in which the keyboard is divided by a dividing line into two separate keyboard divisions which can be pivoted apart about a pivot center of the top end of the dividing line. Two supporting rods which are pivotally connected to each other are respectively disposed on bottom sides of the keyboard divisions. By means of directly shifting apart the keyboard divisions, the thread guide blocks are driven to rotate and slide toward two ends of the thread rod. At this time, the rear end of the keyboard is also lifted by the supporting rods through a certain inclination angle to facilitate the operation of an operator.

SUMMARY OF THE INVENTION

It is a primary object of the present invention to provide a keyboard structure of a portable computer, in which the keyboard is divided by a dividing line into a first and a second separate keyboard divisions which can be pivoted apart about a pivot center of the top end of the dividing line. Two supporting rods which are pivotally connected to each other are respectively disposed on bottom sides of the keyboard divisions. Two thread guide blocks are respectively pivotally connected to outer ends of the supporting rods and fitted around opposite thread sections of the thread rod. By means of directly shifting apart the keyboard divisions, the thread guide blocks are driven to rotate and slide toward two ends of the thread rod. At the same time, the connecting portion of the supporting rods is gradually lifted, whereby when the keyboard divisions are stretched apart, the rear end of the keyboard is also lifted by a certain inclination angle to facilitate the operation of an operator.

It is a further object of the present invention to provide the above keyboard structure in which the pitch of the thread of the thread rod can be elongated to increase the torque for rotating the thread guide block so as to prevent the thread guide blocks from being inward slided and collected when the supporting rods are depressed by the weight of the keyboard divisions. In addition, by means of elongating the pitch of the thread rod, the axial force for sliding and rotating the thread guide blocks along the thread rod is reduced. This facilitates the separation and collection of the keyboard divisions.

The present invention can be best understood through the following description and accompanying drawings, wherein:

DETAILED DESCRIPTION OF THE PREFERRED EMBODIMENT

Figure 1:
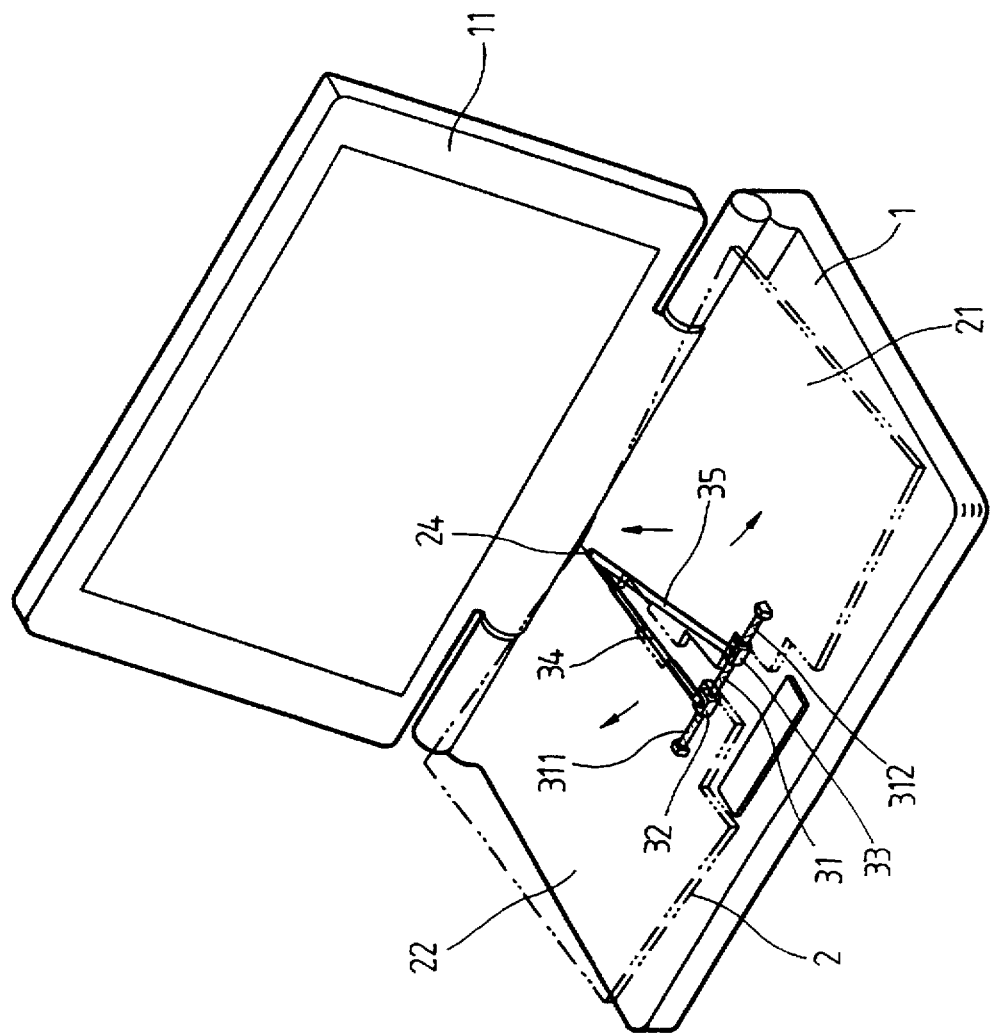
FIG. 1 is a perspective view of the present invention, showing the structure thereof.

Please refer to FIG. 1. The present invention includes a base seat 1, a keyboard 2 and a supporting mechanism 3. A screen 11 is pivotally connected with one side of the base seat 1. The keyboard 2 is divided by a dividing line 23 into a first keyboard division 21 and a second keyboard division 22. A pivot center 24 is disposed at a rear end of the dividing line 23. The supporting mechanism 3 is composed of a thread rod 31, two thread guide blocks 32, 33 and two supporting rods 34, 35. The thread rod 31 is disposed on the base seat 1 and has two opposite thread sections 311, 312 extending from two ends to the center. The two thread guide blocks 32, 33 are respectively fitted around the two thread sections 311, 312. The two supporting rods 34, 35 are respectively secured to proper positions of bottom face of the keyboard divisions 21, 22 with their rear ends pivotally connected with the pivot center 24. The front ends thereof are respectively pivotally connected with the thread guide blocks 32, 33.

Figure 2:
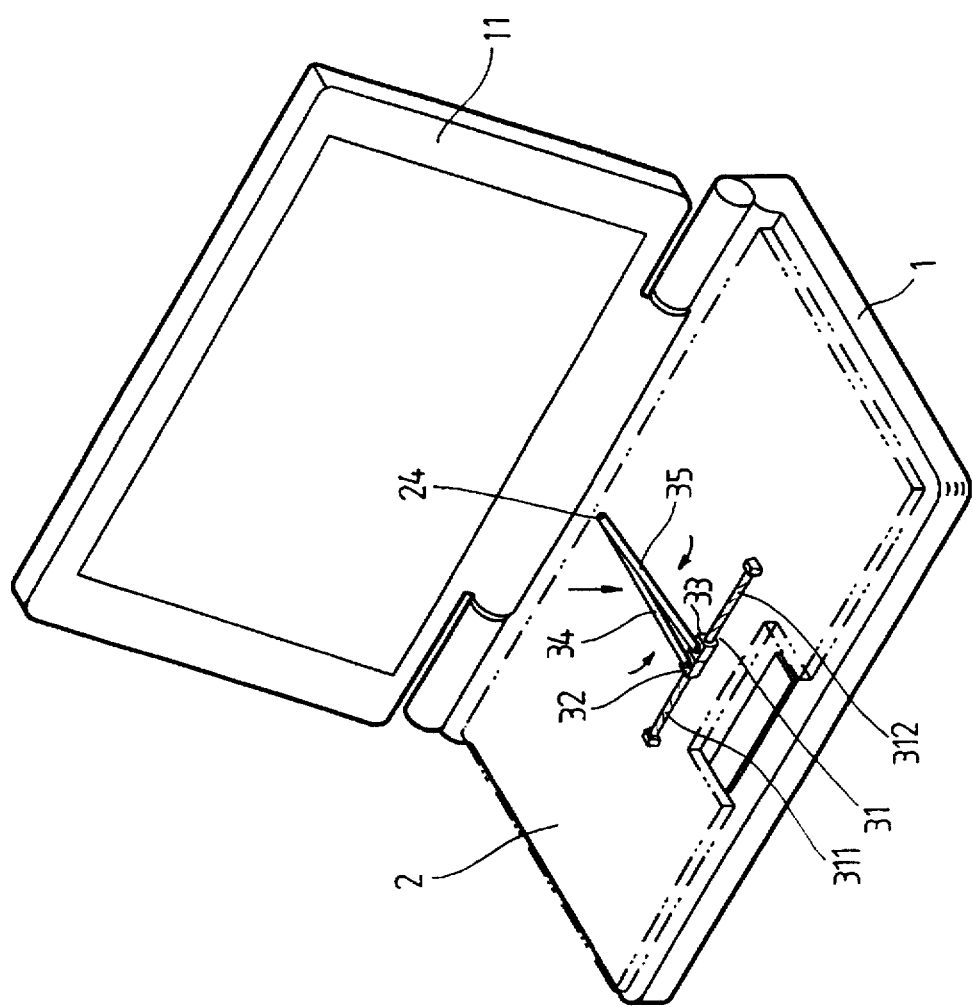
FIG. 2 is a perspective view according to FIG. 1, showing the movement of the internal structure when collecting the keyboard divisions of the present invention.
Figure 3:
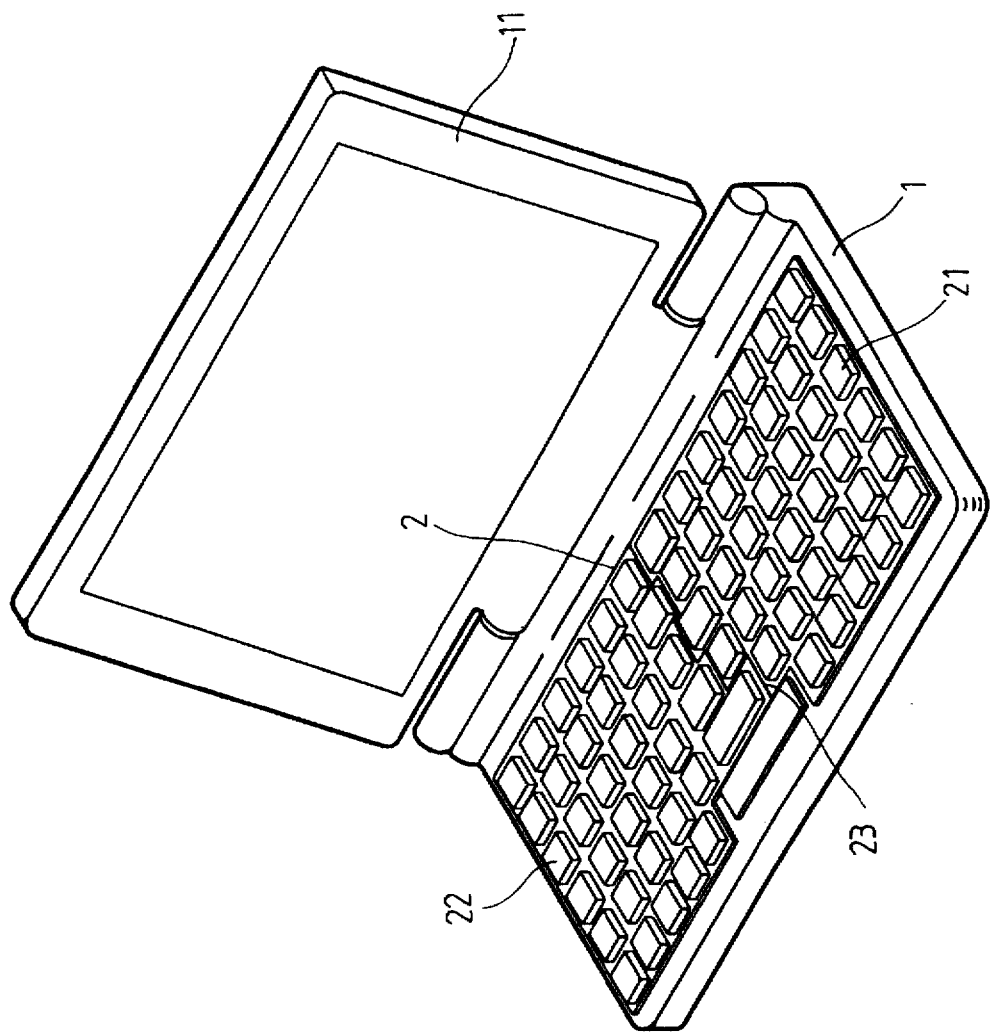
FIG. 3 is a perspective view showing the appearance of the present invention in a collected state.
Figure 4:
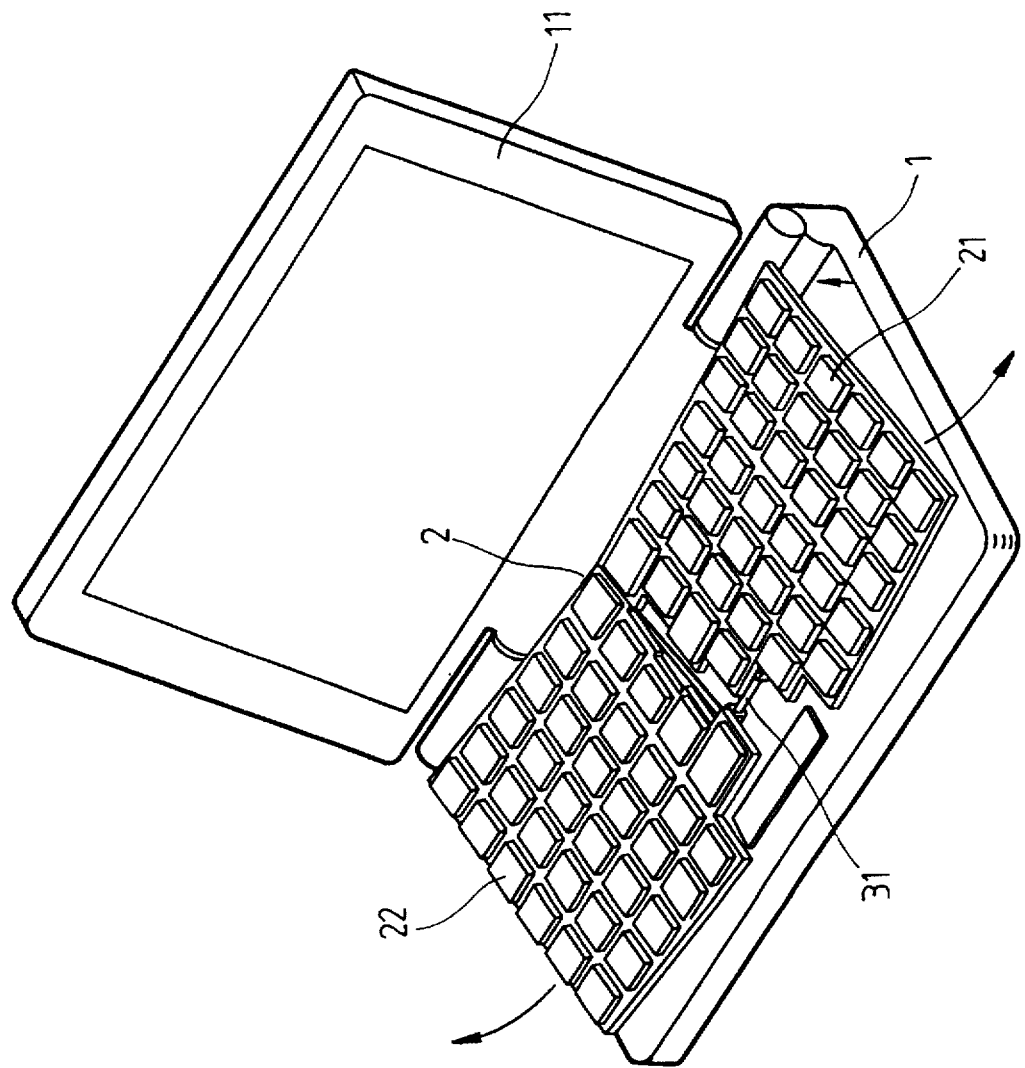
FIG. 4 is a perspective view according to FIG. 3, in which the keyboard divisions are separated.

Referring to FIGS. 2 to 4, in the initial state in which the first and second keyboard divisions 21, 22 are collected as shown in FIG. 3, the thread guide blocks 32, 33 contact with each other and the supporting rods 34, 35 contain a minimum angle in a horizontal state as shown in FIG. 2. When the first and second keyboard divisions 21, 22 are shifted and separated from each other, the thread guide blocks 32, 33 are respectively slided toward two ends of the thread rod 31. Subject to the action of the thread sections 311, 312, the thread guide blocks 32, 33 are rotated about the thread rod 31 in the same direction. At this time, the pivot center 24 ascends and the first and second keyboard divisions 21, 22 on the supporting rods 34, 35 are inclined by a certain angle. Therefore, the front sides of the keyboard divisions 21, 22 are pivoted and stretched apart, while the rear sides thereof are forward and upward lifted by a certain inclination angle so as to meet the configuration of human hands and facilitate the operation of the keyboard.

It should be noted that the above description and accompanying drawings are only used to illustrate one embodiment of the present invention, not intended to limit the scope thereof. Any modification of the embodiment should fall within the scope of the present invention.

What is claimed is:

1. A keyboard structure of a portable computer, comprising:

a base seat;

a supporting mechanism composed of a thread rod, two thread guide blocks and two supporting rods the rear ends of which are pivotally connected, the thread rod being disposed on the base seat and having two opposite thread sections extending from two ends to the center, the two thread guide blocks being respectively fitted around the two thread sections, the front ends of the two supporting rods being respectively pivotally connected with the two thread guide blocks; and a keyboard divided by a dividing line into two separate keyboard divisions respectively secured on the supporting rods, whereby the keyboard divisions can be pivoted about the pivot portion of rear ends of the supporting rods to stretch apart the front sides of the keyboard divisions, by means of shifting and separating the keyboard divisions, the thread guide blocks being driven to rotate about the thread rod so as to upward and forward lift the pivot portion of the supporting rods, whereby the keyboard is also lifted by a certain angle to facilitate the operation of an operator.

2. A keyboard structure as claimed in claim 1, wherein the pitch of the thread of the thread rod is such that the rotational torque of the thread guide blocks is slightly greater than the torque exerted onto the thread guide blocks when the supporting rods suffer the weight of the keyboard divisions.

* * * * *